April 13, 1948.   F. W. McKAY   2,439,692

DOWEL PIN

Filed Dec. 7, 1945

INVENTOR.
Frank W. McKay
BY Victor J. Evans & Co.
ATTORNEYS

Patented Apr. 13, 1948

2,439,692

UNITED STATES PATENT OFFICE 2,439,692

DOWEL PIN

Frank W. McKay, Charlestown, Ind.

Application December 7, 1945, Serial No. 633,434

1 Claim. (Cl. 20—92)

The invention relates to a dowel pin, and more especially to a blind hole dowel pin.

The primary object of the invention is the provision of a pin of this character, wherein the construction of the same will permit its quick and easy removal from a piece of work after having been driven tightly into a blind hole, namely, one which does not extend completely through the work, and even if the pin has been broken off in the seat therefor.

Another object of the invention is the provision of a dowel pin, wherein it is of novel construction in that it has strength and firmness when fitting a blind hole or recess therefor, yet remains readily removable, even if broken within the hole or recess. Considerable difficulty is often experienced in removing an unbroken pin from the hole therefor, and such difficulty is usually increased if the pin becomes broken. The present pin wholly relieves this situation, and enables repair work to be done with dispatch and ease.

A further object of the invention is the provision of a pin of this character, which is simple in construction, thoroughly reliable and efficient in operation, strong, durable, readily and easily applied and removed with dispatch and inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
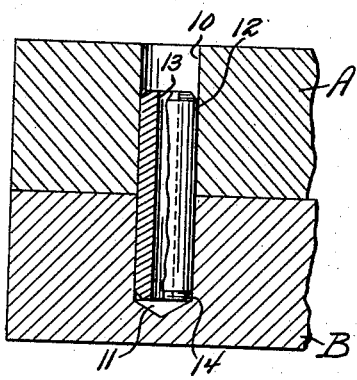
Figure 1 is an elevation, partly broken away, of a dowel pin constructed in accordance with the invention, and in an applied position.
Figure 2:
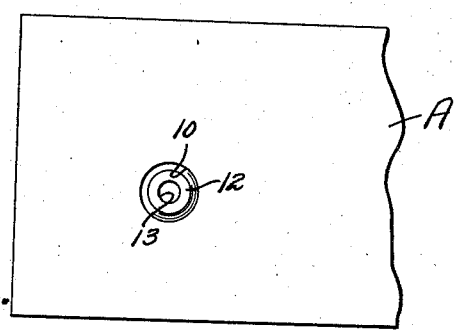
Figure 2 is a plan view with a piece of work fragmentarily disclosed.
Figure 3:
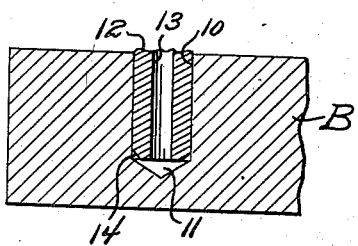
Figure 3 is a view similar to Figure 1 showing the pin broken.
Figure 4:
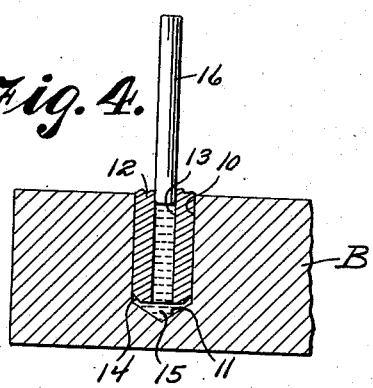
Figure 4 is a view similar to Figure 3 showing initially the manner of removal of the broken portion of the pin from the work.
Figure 5:
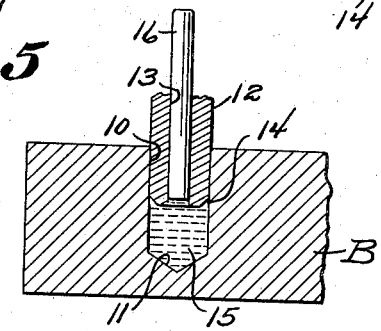
Figure 5 is a view similar to Figure 4 showing a pin being removed from the work.

Referring to the drawing in detail, A and B, respectively, denote portions of sections of work to be united together through dowel pin connection, and continued through one section to the other is a blind hole 10, having at the blind end thereof a sump 11.

Within this hole 10 is to be driven or otherwise seated a dowel pin 12 which in its cross-sectional diameter is substantially equal to the cross-sectional diameter of the said hole for snug fitting therein, whereby the sections A and B will be kept in alignment with each other.

The pin 12 at the longitudinal axis or center thereof is formed with a bore 13, and with its piloting end 14 as shown, and when the pin 12 is engaged in the hole and should become broken, requiring removal of the broken portion from the hole 10, a quantity of oil 15 is deposited through the bore 13, partially filling the same and completely filling the sump 11. Thereafter, a plunger rod 16 is introduced into the bore 13 under pressure, the latter being transferred to the oil 15, and in this manner the pin 12 is extracted from the hole through the effort of the oil to escape therefrom. For supplying the pressure, the plunger rod 16 is normally struck with a hammer. The foregoing procedure is used in removing an unbroken pin.

The pin is inserted with the hole therefore devoid of oil to firmly join two or more parts together, but the hole must be of the character as before described to enable the oil to be introduced therein innermost to the pin for its removal as stated.

What is claimed is:

A dowel joint comprising parts adapted to be secured together by a dowel, one of said parts having a blind hole therein and a sump in its bottom end, and the other of said parts having a hole therein for receiving a dowel, a dowel pin tightly fitted within the parts with one end free of the hole sump of the one part, said dowel pin having a center bore in fluid communication with the sump of the one part whereby for the removal of the dowel pin from the one part, fluid under pressure may be extended through the dowel pin and into the sump to create a back pressure from the dowel pin and effect its removal.

FRANK W. McKAY.

REFERENCES CITED

The following references are of record in the file of this patent:

UNITED STATES PATENTS

| Number | Name | Date |
|---|---|---|
| 402,457 | Kennedy | Apr. 30, 1889 |
| 724,897 | Lee | Apr. 7, 1903 |
| 862,898 | Forsyth | Aug. 13, 1908 |
| 1,184,775 | Rowe | May 30, 1916 |
| 2,104,496 | Schaefer | Jan. 4, 1938 |

FOREIGN PATENTS

| Number | Country | Date |
|---|---|---|
| 16,448 | Great Britain | July 13, 1912 |

OTHER REFERENCES

American Machinist, February 16, 1922, page 271, article by H. P. Camp.